Figure 1:
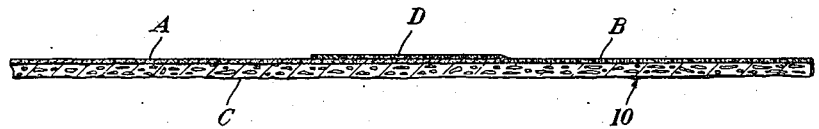

Dec. 31, 1946.  A. GRAVES ET AL  2,413,618
THERMOCOUPLE
Filed July 13, 1943

Inventors: Arnold Graves
and
Gilbert Arthur Richard Jones

Attys: Watson, Cole, Grindle & Watson

Patented Dec. 31, 1946

2,413,618

UNITED STATES PATENT OFFICE 2,413,618

THERMOCOUPLE

Arnold Graves, Surbiton, and Gilbert Arthur Richard Tomes, West Wickham, England; said Tomes assignor to Alltools, Limited, Brentford, England, a company of Great Britain Application July 13, 1943, Serial No. 494,578
In Great Britain August 19, 1942
2 Claims. (Cl. 136—5)

To obtain a thermocouple of high sensitivity and minimum lag it is best to use, as the elements of the thermocouple, strips which have a thickness measured in microns. Such elements can be produced by deposition, e. g. from solution, or by electro-deposition, evaporation, or sputtering, which allows of fairly accurate control of the thickness of the deposit. In the case of evaporation, the material constituting the element is volatilized in vacuo, while in the case of sputtering the volatilization is carried out under a small pressure of an inert gas.

Thermocouple elements so obtained are of necessity extremely fragile and require some form of supporting surface. If the supporting material is in the form of a disc, then there is random dissipation of heat by conduction in all directions. Also if the thickness of the supporting material is large in relation to the thickness of the deposit of the thermocouple elements, then there will also be a further loss by directional conduction of heat along this unwanted path to the cold junctions, which also tends to lower the temperature gradient between the hot junction and the cold junctions and so reduce the E. M. F. per degree centigrade of the thermocouple.

The random unwanted conduction can be eliminated by employing a support of the same width as the elements of the thermocouple, for example by adopting the procedure described in our United States Patent No. 2,381,819 dated August 7, 1945, based on copending application Serial No. 494,577. The directional unwanted conduction parallel to the length of the elements still remains however, and as the cross section of the supports hitherto adopted is many times that of the elements, the loss due to this effect will be severe unless the thermal conductivity of the support is a small fraction only of that of the elements.

The object of the invention is to provide a static vacuum thermocouple (i. e. a thermocouple mounted in a vessel which is subsequently evacuated and in which, after evacuation, the vacuum will persist for a prolonged period without requiring the use of a pump or of a purging element), having the elements of the thermocouple deposited on a support such that the loss due to directional unwanted conduction is reduced to a minimum.

According to the invention the support consists of a thin porous material which is poor conductor of heat and electricity. The words "porous material" are intended to cover those papers, textiles, fibrous substances, cellular substances and the like which, in addition to being poor conductors of heat and electricity, exhibit the property of a decrease in thermal conductivity under high vacuum, but are nevertheless capable of taking a uniform and homogeneous deposit of the thermocouple-constituting materials and affording adequate support therefor. From the materials included by this definition we exclude, however, any which would, after evacuation of the vessel, develop sufficient vapor pressure to destroy the static vacuum.

We find that a porous material of the above character, such as good quality rice paper, is sufficiently sturdy to afford adequate support to the deposits constituting the elements of the thermocouple, while its thermal conductivity under high vacuum is so small that it reduces to a minimum the losses due to directional unwanted conduction.

As an alternative fibrous material, we may mention thin asbestos fabric, the fibres whereof are supported during fabrication by a bonding material, e. g. cellulose acetate, which is removed before or after the deposition of the thermocouple elements, e. g. by burning or by the use of solvents. Cigarette paper may be used, but not if it contains nitre to facilitate combustion as this would destroy the static vacuum. As an example of a suitable cellular material of the above character we may mention the wings of certain insects.

By the expression "thin" we mean that the thickness of the support is of the order of that of cigarette paper, i. e. about one thousandth of an inch or less.

The deposits constituting the elements of the thermocouple may contact directly or indirectly, as described in our said Patent No. 2,381,819. Thus they may form a butt or overlap junction, or may be spaced and bridged by a deposit of a suitable third material. Again, the deposits may be formed simultaneously and arranged as it were, to interleave at the zone of overlap, likewise as described in Patent No. 2,381,819.

Figure 2:
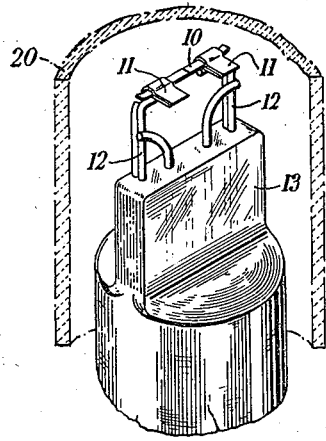
Figure 3:
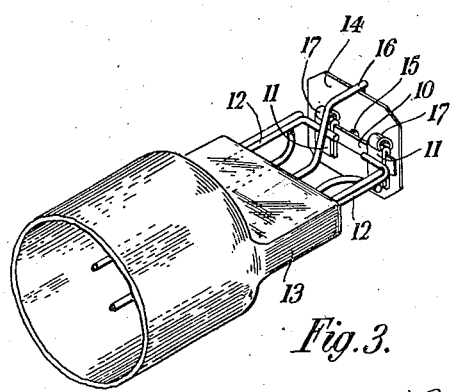

The invention will now be described in further detail, by way of example, with reference to the accompanying drawing, in which:

Fig. 1 is a section, greatly enlarged, through a thermocouple according to the invention, and Figs. 2 and 3 are enlarged perspective views showing two alternative forms of pinch, each carrying a thermocouple and each ready for sealing into a tube which is to be subsequently evacuated.

Like reference characters denote like parts throughout the figures.

As shown in Fig. 1 the thermocouple 10 consists of deposits A, B on a narrow strip C of good quality rice paper of antimony and bismuth respectively, which deposits overlap at the centre to form the hot junction D. The deposits may be formed as described in our said Patent No. 2,381,819. In the arrangements shown in Figs. 2 and 3, the ends of the strip are clipped by metal clips 11 to relatively massive wires 12, e. g. of copper, which will assist in maintaining the cold junctions cool. If desired deposits of a metal such as copper, silver or gold can be formed on the strip by evaporation at its ends to assist in making good electrical and thermal connections at the cold junctions.

The wires 12 to which the ends of the strip are connected are mounted in a pinch 13 which is afterwards sealed into a tube, preferably of the kind described in our copending application Serial No. 494,576 which is afterwards evacuated to produce a static vacuum thermocouple. Part of such a tube is indicated at 20 in Fig. 2. By the expression "pinch" we mean the illustrated tubular glass body 13, which is closed and reduced in size, as shown, at its upper end and supports the wires 12, from which electrical connections are made to an instrument for measuring the E. M. F. generated by the thermocouple. In the arrangement shown in Fig. 3, a mask 14, having a central aperture 15 located above the hot junction, is provided for confining the radiation to the hot junction, the mask being carried by an additional wire 16 mounted in the pinch. Spring clips 17, fitted over the clips 11, serve to ensure good electrical and thermal connection between the wires 12 and the thermocouple.

Alternatively the thermocouple may be mounted close up against the window of material transparent to infra red radiation, through which the radiation enters the tube, a focusing mask being painted or otherwise formed on the outer or inner surface of the window.

When antimony and bismuth are used as the elements of the thermocouple it is found that, under suitable conditions, the bismuth will form a black coating at the hot junction, which serves as a target or receiver for the radiation. If desired, however, a further deposit may be formed at the hot junction, e. g. a deposit of bismuth black, antimony black, platinum black or other black material appropriate to the wave length of the radiation to be received. The term "black" refers, of course, to materials which are black to infra red radiation, and the materials concerned need not necessarily be black to radiation in the visible spectrum.

What we claim as our invention and desire to secure by Letters Patent is:

1. A thermocouple, comprising a narrow strip of rice paper, of thickness not exceeding about one thousandth of an inch, having a surface thereof covered by contacting exceedingly thin, uniform and homogeneous deposits of thermoelectrically dissimilar materials constituting the elements of the thermocouple.

2. A thermocouple, comprising a narrow strip of cigarette paper free from adulterants such as nitre and of thickness not exceeding one-thousandth of an inch, one surface whereof supports contacting exceedingly thin, uniform and homogeneous deposits of thermoelectrically dissimilar materials constituting the elements of the thermocouple.

ARNOLD GRAVES.
GILBERT ARTHUR RICHARD TOMES.